(12) United States Patent
Sugimoto

(10) Patent No.: US 7,376,334 B2
(45) Date of Patent: May 20, 2008

(54) DATA RECORDING/REPRODUCTION APPARATUS, METHOD AND PROGRAM FOR REAL-TIME PROCESSING

(75) Inventor: Kinichi Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 922 days.

(21) Appl. No.: 10/839,285

(22) Filed: May 6, 2004

(65) Prior Publication Data

US 2004/0223730 A1  Nov. 11, 2004

(30) Foreign Application Priority Data

May 7, 2003 (JP) .............................. 2003-128619

(51) Int. Cl.
*G11B 27/00* (2006.01)
(52) U.S. Cl. .............................. 386/52; 386/46; 707/7
(58) Field of Classification Search .................. 386/46, 386/52, 83, 95, 124–126; 707/1–10, 100, 707/103

See application file for complete search history.

(56) References Cited

U.S. PATENT DOCUMENTS 5,737,747 A * 4/1998 Vishlitzky et al. .......... 711/118

6,556,998 B1 * 4/2003 Mukherjee et al. ........... 707/10

FOREIGN PATENT DOCUMENTS

JP      11-69279       3/1999
JP      2001-309333    11/2001

* cited by examiner

*Primary Examiner*—Thai Q. Tran
*Assistant Examiner*—Mishawn Dunn
(74) *Attorney, Agent, or Firm*—Young & Thompson

(57) ABSTRACT

A data recording/reproduction apparatus classifies each request into any one of a real-time processing data request, a metadata request, and a non-real-time data request and accumulates each classified request. A request readout device in the apparatus sequentially reads out each accumulated input/output request in accordance with a predetermined reference time. In order to attain a desired data rate of the real-time processing data, the request readout device delays reading out a metadata request for a fixed period specified by the reference time. A processing of delayed metadata input/output request collectively is executed with a subsequent processing metadata input/output request.

24 Claims, 9 Drawing Sheets

FIG. 10

| ATTRIBUTE ||
|---|---|
| FILE NAME ||
| DATE ||
| FILE SIZE ||
| DIVISION SIZE ||
| NUMBER OF DIVISIONS ||
| AREA LENGTH ||
| MEDIUM #0 | FILE IDENTIFIER #0 |
| MEDIUM #1 | FILE IDENTIFIER #1 |
| MEDIUM #2 | FILE IDENTIFIER #2 |
| MEDIUM #3 | FILE IDENTIFIER #3 |
| DIVISION SIZE ||
| NUMBER OF DIVISIONS ||
| AREA LENGTH ||
| MEDIUM #0 | FILE IDENTIFIER #0 |
| MEDIUM #1 | FILE IDENTIFIER #1 |
| MEDIUM #2 | FILE IDENTIFIER #2 |
| ⋮ ||

DATA RECORDING/REPRODUCTION APPARATUS, METHOD AND PROGRAM FOR REAL-TIME PROCESSING

CROSS-REFFERENCES TO RELATED APPLICATIONS

The disclosure of Japanese Patent Application No. JP2003-128619 filed on May 7, 2003 including the specification, drawings and abstract is incorporated herein by reference in its entirety.

BACKGROUND OF THE INVENTION

1. Field of the Invention

The present invention relates to a recording/reproduction apparatus that has a file system and executes the data required real-time recording/reproduction processing. In particular, the present invention relates to a recording/reproduction apparatus having a mechanism for managing an operation log of a file system and synchronization of metadata at the time of a the data required real-time recording/reproduction operation, a recording/reproduction method executed by the recording/reproduction apparatus, and a recording/reproduction program for causing the recording/reproduction apparatus to execute recording/reproduction processing.

2. Description of Related Art

As a recording/reproduction apparatus that executes video recording processing and reproduction processing, there has conventionally been known a recording/reproduction apparatus having a construction where video writing (recording processing) and reading (reproduction processing) are distinguished from each other. For instance, in JP 11-69279 A (see FIGS. 1 to 3 of that document) Patent document 1, there is disclosed a technique with which in a recording/reproduction apparatus that simultaneously performs recording and reproduction of multiple pieces of video data, a queue is provided for each of writing and reading and the queue on a writing side is controlled with a higher priority, thereby eliminating a failure on a recording side.

Also, for instance, in JP 2001-309333 A (Patent Document 2), there is disclosed a technique with which in a video server that utilizes a disk array or the like, band allocation is managed, the transfer of real-time data between apparatuses is realized, the real-time data transfer of a video or the like is distinguished from the transfer of data that does not require a real-time property, and the band allocation is performed based on a result of the distinguishing.

The recording/reproduction apparatus disclosed in Patent Document 1 performs processing without distinguishing among various kinds of processing such as logging concerning a recording operation and writing of metadata for file management. Consequently, it is impossible to manage the degree of an I/O load imposed by the management of information other than video data midway through a video recording operation.

Also, in Patent Document 2, no description is given concerning metadata necessary for file management, management of an execution timing thereof, and the like, and there does not exist an idea that a load is suppressed based on a parameter concerning a processing request frequency in an operation such as video recording/reproduction.

Meanwhile, it is conceivable that there frequently occurs a situation where a recording/reproduction apparatus used in an ordinary household is powered off during execution of recording/reproduction processing, and it is impossible to avoid a possibility that data will be lost due to such a situation. As a countermeasure against such a problem, there is generally performed establishment of synchronization or logging of input/output operations (recording of contents of executed operations).

Accordingly, input/output operations accompanying the synchronization operation or the log generation are frequently performed, so that particularly in the case of a recording/reproduction apparatus for an optical disk or the like whose random access performance is low, considerable time is consumed by the input/output operations. Consequently, there occurs a problem that processing performance concerning video data is lowered due to an influence of the input/output operations accompanying the synchronization operation or the log generation.

The present invention addresses and seeks to solve, at least in part the problems described above and making it possible, in a recording/reproduction apparatus, such as an optical disk recorder, whose random access performance is low, to adjust a processing time consumed by a synchronization operation or log generation and to improve the reliability of the apparatus without causing a lowering of the processing performance.

Also, the present invention is aimed at making it possible, in a recording reproduction apparatus, such as an optical disk recorder, whose random access performance is low, to enable I/O scheduling based on importance of data, and consequently to increase processing efficiency under an environment where the recording/reproduction processing of information, such as a video, coexists with the input/output of another file to improve the function of the apparatus.

SUMMARY OF THE INVENTION

In order to ameliorate or solve the above-mentioned problems, the invention in one embodiment provides a data recording and reproduction apparatus comprising a recording/reproduction controller that controls recording and reproduction of information; a request classifier that classifies each request from the recording/reproduction controller into any one of a real-time processing data request, a metadata request, and a non-real-time data request; an input/output request accumulator that sequentially accumulates each classified input/output request; an input/output request readout device that, when any input/output requests are accumulated in the input/output request accumulator, sequentially reads out each accumulated input/output request in accordance with a predetermined reference time; and an input/output execution unit that, in response to each input/output request read by the input/output request readout device, executes input/output processing with respect to a storage medium, wherein, in order to attain a desired data rate of the real-time processing data, the input/output request readout device delays reading out a metadata input/output request for a fixed period specified by the reference time and collectively executes processing of a delayed metadata input/output request with a subsequent metadata input/output request.

With the construction described above where the desired data rate of the real-time processing data is attained by delaying and collectively executing the metadata input/output request readout processing, it becomes possible to adjust a processing time consumed by a synchronization operation and to improve the reliability of the apparatus without causing a lowering of the processing performance.

Here, the recording/reproduction apparatus may be constructed so that a delay period, during which the writing or reading of the metadata is halted, is increased or decreased within a range where the desired data rate of the stream data is attained.

With the construction described above where the delay period is increased or decreased, it becomes possible to execute input/output processing without waste of time.

Further, the invention in another embodiment provides a data recording and reproduction apparatus comprising a recording/reproduction controller that controls recording and reproduction of information; a request classifier that classifies each request from the recording/reproduction controller into any one of a real-time processing data request, a metadata request, and a non-real-time data request; an input/output request accumulator that sequentially accumulates each classified input/output request;

an input/output request readout device that, when any input/output requests are accumulated in the input/output request accumulator, sequentially reads out each accumulated input/output request in accordance with a predetermined reference time; and an input/output execution unit that, in response to each input/output request read by the input/output request readout device, executes input/output processing with respect to a storage medium, wherein, in order to attain a desired data rate of the real-time processing data, the input/output request readout device delays reading out a non-real-time data input/output request for a fixed period specified by the reference time and collectively executes processing of a delayed metadata input/output request with a subsequent metadata input/output request.

With the construction described above where the desired data rate of the stream data is attained by postponing and collectively executing the metadata input/output request reading processing, it becomes possible to adjust a processing time consumed by log generation and to improve the reliability of the apparatus without causing a lowering of the processing performance.

The recording/reproduction apparatus may be constructed so that a delay period, during which writing or reading of the non-real-time data is halted, is increased or decreased within a range in which the desired data rate of the stream data is attained.

With the construction described above where the postponement period is increased or decreased, it becomes possible to execute input/output processing without waste of time.

The recording/reproduction apparatus may be constructed so that the input/output request accumulator includes a real-time processing data input/output queue holder that holds each real-time processing data input/output request; a metadata input/output queue holder that holds each metadata input/output request; and a non-real-time data queue holder that holds each non-real-time data input/output request, the request classifier that classifies each input/output request based on contents of a corresponding recording/reproduction request from the recording/reproduction controller and stores each classified input/output request in any one of the real-time processing data input/output queue holder, the metadata input/output queue holder, and the non-real-time data queue holder in accordance with a result of the classification, and when any input/output requests are accumulated in any of the real-time processing data input/output queue holder, the metadata input/output queue holder, and the non-real-time data queue holder, the input/output request readout device sequentially reads out each accumulated input/output request in accordance with the reference time.

With the construction described above where storing of data into the respective data-type-specific holding units is performed, it becomes possible to easily perform data-type-specific queue storing and reading.

Further, according to a further embodiment of the present invention, a data recording and reproduction apparatus comprises a recording/reproduction controller that controls recording and reproduction of information; a request classifier that classifies each request from the recording/reproduction controller into any one of a real-time processing data request, a metadata request, and a non-real-time data request; an input/output request accumulator that sequentially accumulates each classified input/output request;

an input/output request readout device that, when any input/output requests are accumulated in the input/output request accumulator, sequentially reads out each accumulated input/output request in accordance with a predetermined reference time; and an input/output execution unit that, in response to each input/output request read by the input/output request readout device, executes input/output processing with respect to a storage medium, wherein the input/output request accumulator includes: a plurality of real-time processing data input/output queue holder hold each real-time processing data input/output request; a metadata input/output queue holder holds metadata input/output request; and a non-real-time data queue holder holds each non-real-time data input/output request, when a classified input/output request is a real-time processing data input/output request, the input/output request accumulator selects one of the plurality of real-time processing data input/output queue holder in accordance with predetermined priorities and executes processing for accumulating the input/output request in the selected real-time processing data input/output queue holder, and when any input/output requests are held in the plurality of input/output queue holder, the input/output request readout device reads out each input/output request in order of priorities, halts processing for reading each input/output request corresponding to a low desired data rate until a fixed period has elapsed or a fixed data amount of input/output requests is accumulated, and executes processing for sorting out each input/output request accumulated during the halt and collectively reading each sorted-out input/output request.

With the construction described above, it becomes possible to perform I/O scheduling based on the importance of data, which makes it possible to improve the function of the apparatus by increasing processing efficiency under an environment where the recording/reproduction processing of information, such as a video, coexists with the input/output of another file.

The recording/reproduction apparatus may be constructed so that when a plurality of pieces of real-time processing data are to be recorded or reproduced, a processing time per unit time is calculated for each piece of real-time processing data based on a data rate thereof, and a period for halting writing or reading of the metadata is increased or decreased based on a total sum of the processing times so that desired data rates of the real-time processing data are attained.

With the construction described above, it becomes possible to guarantee the desired data rates of multiple pieces of real-time processing data, which makes it possible to improve the reliability of the apparatus without causing a lowering of the processing performance.

The recording/reproduction apparatus may be constructed so that when a plurality of pieces of real-time processing data are to be recorded or reproduced, a processing time per unit time is calculated for each piece of real-time processing data based on a data rate thereof, and a period for halting writing or reading of the non-real-time data is increased or decreased based on a total sum of the processing times so that desired data rates of the real-time processing data are attained.

With the construction described above, it becomes possible to guarantee the desired data rates of multiple pieces of real-time processing data, which makes it possible to improve the reliability of the apparatus without causing a lowering of the processing performance.

The recording/reproduction apparatus may be constructed so that a processing amount per unit time for carrying out input/output of the metadata is set based on an input/output processing time required by input/output of the real-time processing data, and that a number of times of metadata input/output request reading is limited based on the processing amount.

With the construction described above, it becomes possible to set an upper limit for a processing time consumed by the metadata input/output by limiting the number of times of the metadata input/output request reading.

The recording/reproduction apparatus may be constructed so that a processing amount per unit time for carrying out input/output of the non-real-time data other than video data is set based on an input/output processing time required by input/output of the video data, and that a number of times of non-real-time data input/output request reading is limited based on the processing amount.

With the construction described above, it becomes possible to set an upper limit for a processing time consumed by the non-real-time data input/output by limiting the number of times of the non-real-time data input/output request reading.

Furthermore, according to a still further embodiment, a recording/reproduction apparatus comprises a recording/reproduction controller that controls recording and reproduction of information; a request classifier that classifies each request from the recording/reproduction controller into any one of a real-time processing data request, a metadata request, and a non-real-time data request; an input/output request accumulator that sequentially accumulates each classified input/output request; an input/output request readout device that, when any input/output requests are accumulated in the input/output request accumulator, sequentially reads out each accumulated input/output request in accordance with a predetermined reference time; an input/output execution designator, in response to each input/output request read by the input/output request readout device that designates execution of input/output processing with respect to a storage medium; and a plurality of storage medium controller that respectively control input/output of information with respect to a plurality of storage media, wherein in response to each real-time processing data input/output request, the input/output execution designator selects one of the plurality of storage medium controller, designates execution of input/output processing of the real-time processing data, and executes writing or reading while performing switching among the storage medium controller in order at cycles of a fixed time or a fixed data amount, and in response to each metadata input/output request or each non-real-time data input/output request, the input/output execution designator selects one of the storage medium controller that is not designated to execute the real-time processing data input/output, and designates execution of input/output processing specified by the metadata input/output request or the non-real-time data input/output request.

With the construction described above, it becomes possible to execute appropriate input/output processing in accordance with the importance of data.

The recording/reproduction apparatus may be constructed so that when data is divided across the plurality of storage media and divided pieces of data are recorded or reproduced in order, a fixed value indicating the fixed time or the fixed data amount for division across the plurality of storage media predetermined based on a data rate of the stream data is set and recording or reproduction is executed while performing switching among the storage media at cycles of the fixed value.

With the construction described above, it becomes possible to make effective use of the multiple storage media.

BRIEF DESCRIPTION OF THE DRAWINGS

FIG. 10 is an explanatory diagram showing a data structure of file management data in the second embodiment.

DETAILED DESCRIPTION OF PREFERRED EMBODIMENTS

Embodiments of the present invention will now be described with reference to the drawings.

First Embodiment

Figure 1:
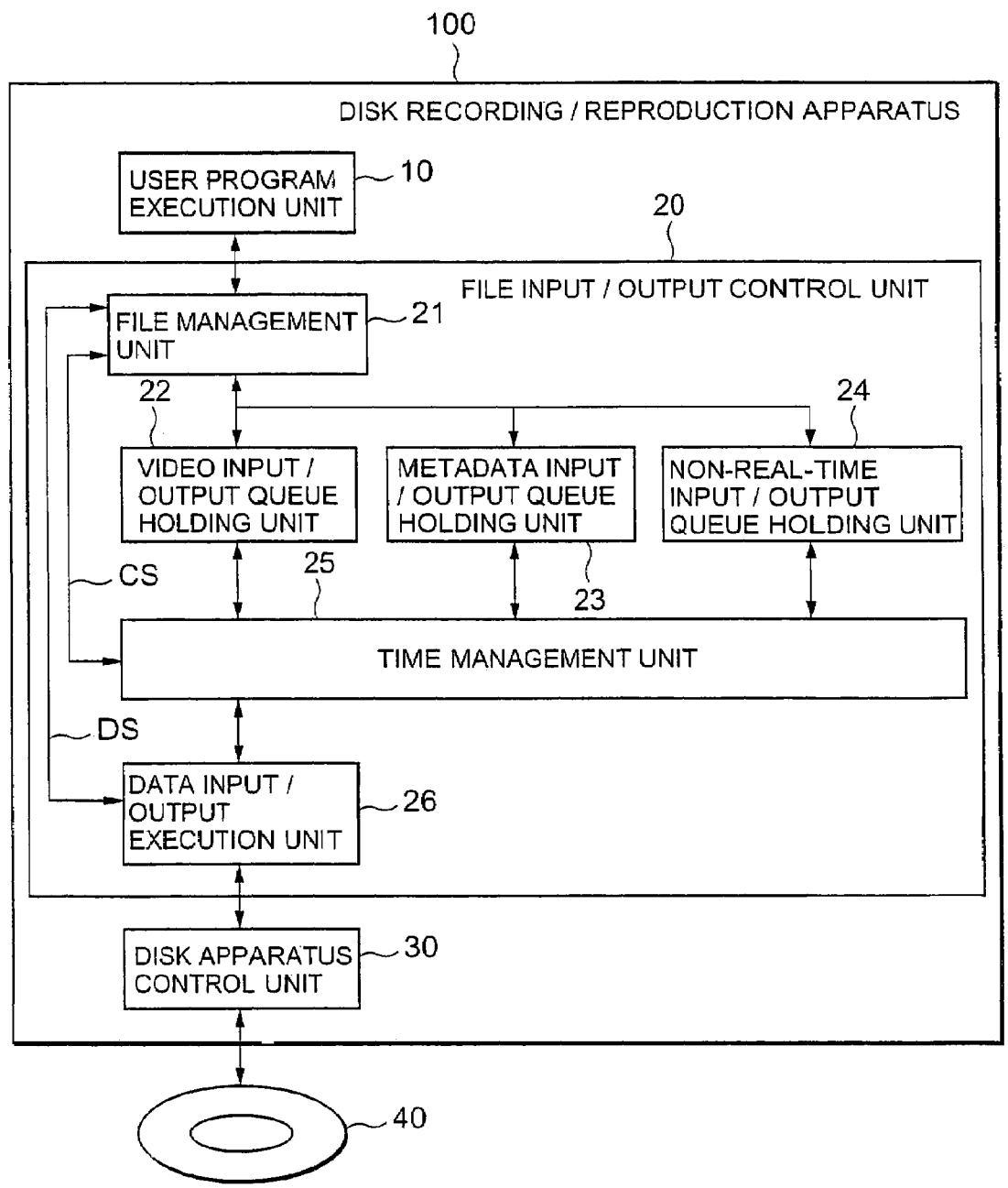
FIG. 1 is a block diagram showing a disk recording/reproduction apparatus in a first embodiment of the present invention.

FIG. 1 is a block diagram showing a disk recording/reproduction apparatus 100 in a first embodiment of the present invention. The disk recording/reproduction apparatus 100 includes a user program execution unit 10, a file input/output control unit 20, and a disk apparatus control unit 30.

The disk recording/reproduction apparatus 100 is provided with a mechanism (not shown) for loading a storage medium (recording medium) 40, on which data, such as video data, is recorded, and executes recording processing for recording data on the storage medium 40 and a function of executing reproduction processing for reading the recorded data from the storage medium 40 and reproducing the read data. More specifically, the disk recording/reproduction apparatus 100 is used as a video recording/reproduction device such as a DVD (Digital Versatile Disc) recorder/player.

In this embodiment, the disk recording/reproduction apparatus 100 is assumed as an apparatus (optical disk apparatus, for instance) that performs recording/reproduction processing onto/from the storage medium 40 whose data writing and reading speeds are relatively low. Note that the relatively low-speed storage medium 40 means the storage medium 40 whose processing speed in the disk recording/reproduction apparatus is low as compared with a storage medium such as a magnetic disk, whose processing speed is relatively high. In more detail, the relatively low-speed storage medium 40 is a storage medium such as an optical disk, with which it is difficult to reduce an average time required to access from the disk recording/reproduction apparatus to 100 [ms] or less, for instance.

Also, in this embodiment, the disk recording/reproduction apparatus 100 deals with data, such as video data or audio data, that requires real-time processing. In the following description, it is assumed that video data is dealt with as the data that requires real-time processing.

The user program execution unit 10 executes an application program installed in the disk recording/reproduction apparatus 100 (in the user program execution unit 10, for instance) and performing various kinds of control based on the application program. The application program is a control program for causing the disk recording/reproduction apparatus 100 to execute various kinds of processing concerning recording of a video, reproduction of the video, handling of code information on a computer, and the like, for instance.

The user program execution unit 10 outputs a file input/output command to the file input/output control unit 20 in accordance with the application program and comprehends characteristics of data to be dealt with and executing control suited for the data characteristics.

It should be noted here that the file input/output command is a control signal for informing the file input/output control unit 20 (precisely, a file management unit 21) of the kind of data to be applied to recording processing and reproduction processing, the type of data writing or reading, the direction of data to be inputted/outputted (input direction/output direction, for instance), the data amount of the data to be inputted/outputted, and the like.

The file input/output control unit 20 includes a file management unit 21, a video input/output queue holding unit 22, a metadata input/output queue holding unit 23, a non-real-time input/output queue holding unit 24, a time management unit 25, and a data input/output execution unit 26.

The file management unit 21 performs various kinds of management concerning files to be inputted/outputted. In this example, as the files that are the target of input/output, a video file, a normal file, and file management data are dealt with. The video file is a file in which video data (example of real-time data) that requires real-time processing and band management is stored. The normal file is a file in which non-real-time data that requires neither real-time processing nor band management is stored. The file management data is metadata showing information for managing the video file and the normal file.

The file management unit 21 receives the file input/output command from the user program execution unit 10 and, in order to execute the input/output of a corresponding file, specifying the physical arrangement of data (data in the corresponding file) with reference to information stored in an area management table held in an internal memory. Note that the "physical arrangement of data" means a position on the storage medium 40, at which the corresponding file is stored, or a position on the storage medium 40 at which the corresponding file is to be written.

Also, the file management unit 21 generates a data input/output command based on the specified data arrangement. Here, the data input/output command is a control signal containing information for identifying the physical arrangement of corresponding data.

The file management unit 21 transmits the generated data input/output command to any one of queue holding units 21, 22, and 23 in accordance with the type of the corresponding data. In more detail, if the type of the corresponding data is real-time data, the file management unit 21 transmits the generated data input/output command to the video input/output queue holding unit 22. Also, if the type of the corresponding data is non-real-time data, the file management unit 21 transmits the generated data input/output command to the non-real-time input/output queue holding unit 24. Further, if the type of the corresponding data is metadata, the file management unit 21 transmits the generated data input/output command to the metadata input/output queue holding unit 23.

In this example, a collection (queue) of data input/output commands held in the video input/output queue holding unit 22 is referred to as the "video input/output queue" (example of a real-time input/output queue) for designating the input/output of video data. Also, a collection (queue) of data input/output commands held in the non-real-time input/output queue holding unit 24 is referred to as the "non-real-time input/output queue" for designating the input/output of non-real-time data. Further, a collection (queue) of data input/output commands held in the metadata input/output queue holding unit 23 is referred to as the "metadata input/output queue" for designating the input/output of metadata.

It should be noted here that in this example, the file management unit 21, in recording processing and reproducing processing, sends data (video data, non-real-time data, or metadata) to be written on the storage medium 40 to the data input/output execution unit 26 by means of a data signal (DS) receiving data (video data, non-real-time data, or metadata) read from the storage medium 40 from the data input/output execution unit 26 by means of a data signal (DS). Also, in order to realize various kinds of control in recording processing and reproduction processing, the file management unit 21 performs the exchange of a control signal (CS) with the time management unit 25.

The video input/output queue holding unit 22, the metadata input/output queue holding unit 23, and the non-real-time input/output queue holding unit 24 each have a memory in which it is possible to accumulate multiple data input/output commands. Note that the data input/output commands held in the respective queue holding units 22, 23, and 24 are sequentially read in a FIFO (First In First Out) manner and are used.

The time management unit 25 selects a queue holding unit to be used for execution designation from among the queue holding units 22, 23, and 24 through I/O allocation processing to be described later (see FIG. 5), reading each data input/output command held in the selected queue holding unit, transmitting the read data input/output command to the data input/output execution unit 26, and instructing the data input/output execution unit 26 to execute the transmitted data input/output command.

The data input/output execution unit 26 generates an input/output execution command in response to each received data input/output command and outputs the generated input/output execution command and data to be inputted/outputted to the disk apparatus control unit 30, thereby executing the input/output of data through the disk apparatus control unit 30. Note that the data input/output execution unit 26 performs the sending/reception of data to be inputted/outputted to/from the file management unit 21 using a data signal. Also, note that data that is the target of reading/writing is stored in the memory in the file management unit 21 or a memory in the user program execution unit 10.

Next, information to be managed by the file management unit 21 will be described with reference to FIGS. 2 and 3.

Figure 2:
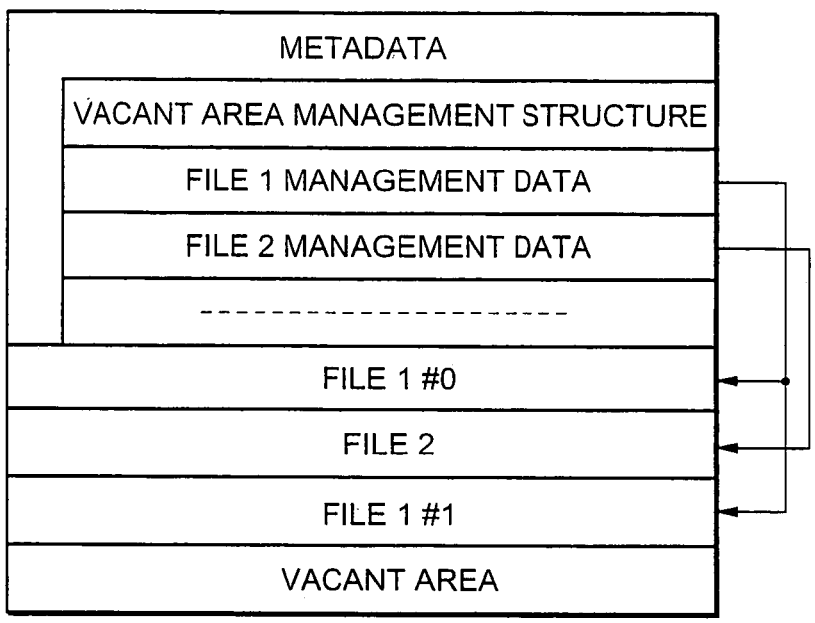
FIG. 2 is an explanatory diagram showing a data storage state in a management unit memory provided in a file management unit.

FIG. 2 is an explanatory diagram showing a storage state in the memory (hereinafter referred to as the "management unit memory") provided in the file management unit 21. In the management unit memory, there are stored metadata used as information for managing each file, and each file containing video data or a normal file. Note that in FIG. 2, a vacant area, in which no data is saved, is also illustrated.

The metadata includes data showing a vacant area management structure showing the capacity of the vacant area, the position thereof, and the like on the storage medium 40 and file management data for managing each file. File 1 management data shown in FIG. 2 is information for specifying the physical position (head address of a storage area, for instance), the length (data length showing a length from the head address, for instance), and the like of a file 1. File 2 management data is information for specifying the physical position, the length, and the like of a file 2. Note that the file 1 is composed of files stored in two successive areas, that is, a file 1#0 having a start address of #0 and a file 1#1 having a start address of #1.

Figure 3:
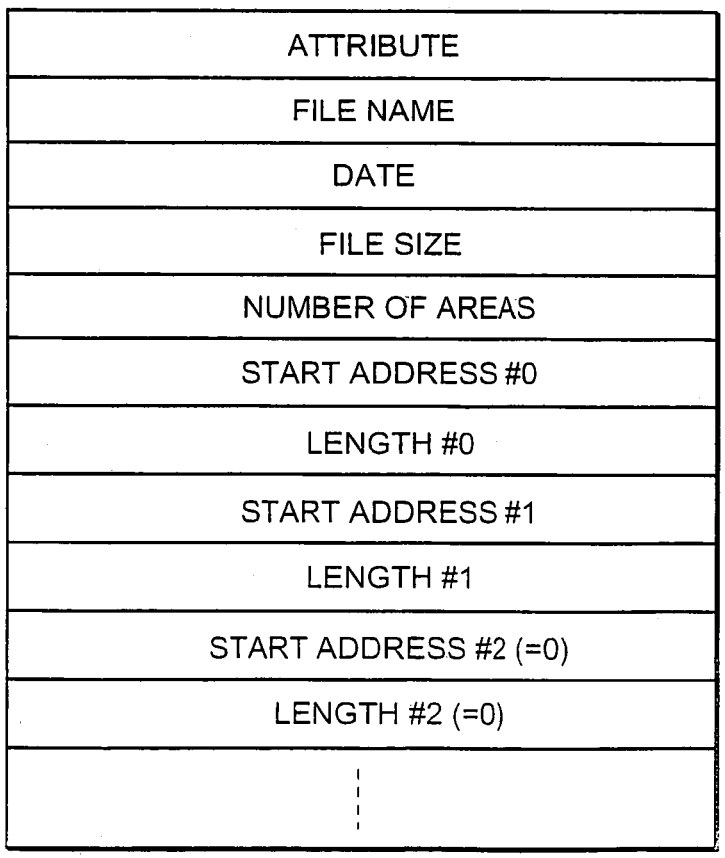
FIG. 3 is an explanatory diagram showing a data structure of file management data.

FIG. 3 is an explanatory diagram showing a data structure of the file management data. As shown in FIG. 3, the file management data includes an attribute, a file name, a date, a file size, the number of areas, and the start address and length of each file constituting a corresponding file.

The "attribute" is data showing identification information for identifying the data type of the file such as a normal file, a video file, a directory, or metadata. The "file name" is data showing the name of the file for identifying the file. The "date" is data showing a creation date and time of the file. The "file size" is data showing the size of the file. The "number of areas" is data showing the number of successive areas in which the file is stored (in the case of the file 1 shown in FIG. 2, for instance, its corresponding number of areas becomes two because the file 1 is composed of two files).

Also, the "start address" is data showing the head address of the storage area of each file constituting the corresponding file. The "length" is data showing the data length of each file constituting the corresponding file. One pair of the "start address" and the "length" is set for each file managed with the file management data. That is, the number of pairs of the "start address" and the "length" set in the file management data is equal to the number of areas.

Figure 4:
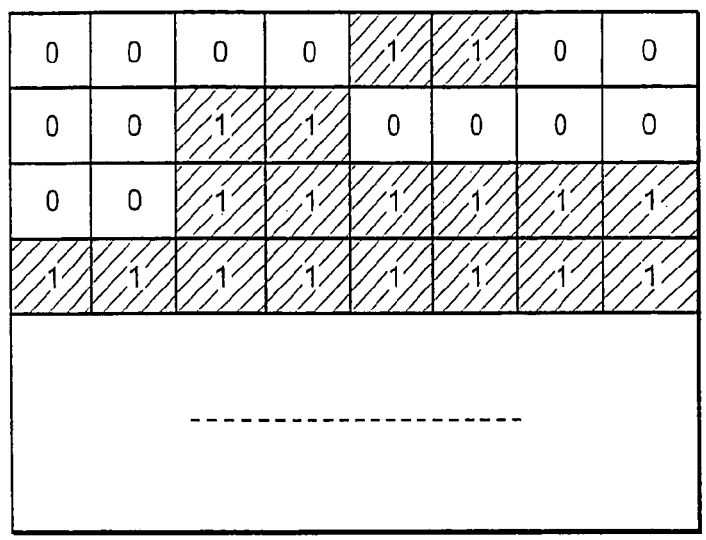
FIG. 4 is an explanatory diagram showing a vacant area management structure in metadata.

FIG. 4 is an explanatory diagram showing the vacant area management structure in the metadata (see FIG. 2). In this example, for instance, the entire data area of an optical disk (example of the storage medium 40) is managed in units of blocks having a fixed length, and the vacant area management structure is provided with an allocation bitmap data structure shown in FIG. 4 with which whether each block is used is managed using a bit of "0" or "1".

In addition, otherwise as structure of the metadata managed by the file management unit 21 mentioned above, it may be the area management structure of a general-purpose file system. In this case, it is sufficient that required file attributes are additionally defined. A standard file system, such as ISO 9293 standard or ISO 9660 standard, is included in a general-purpose file system.

Next, an operation of the video recording/reproduction apparatus 100 in the first embodiment of the present invention will be described with reference to the drawings.

Here, a method for setting a time (hereinafter referred to as the "reference time t0"), with reference to which the operation is managed, will be described. The reference time t0 serves as a reference value concerning control of data-type-specific input/output allocation (meaning allocation of an input/output processing according to each queue, hereinafter referred to as the "I/O allocation") at the time of execution of recording processing or reproduction processing.

The upper limit value (Tmax) of the reference time t0 is set in view of conditions for realizing an application under usage environments of the apparatus 100. For instance, when it is required to hold a recording state for a predetermined period that is five seconds or less at the time of execution of recording processing, the upper limit value Tmax of the reference time t0 is set to five seconds.

On the other hand, the lower limit value (Tmin) of the reference time t0 is set to a value at which the number of times of access performed by the disk recording/reproduction apparatus 100 is suppressed to guarantee its performance. For instance, in order to guarantee a data rate of 60% or higher with respect to burst performance, it is required to suppress overhead (meaning the input/output processing of data other than video data, in this example) to 40% or less. Therefore, a time (hereinafter referred to as the "overhead time t1") required to access metadata and non-real-time data from the disk recording/reproduction apparatus 100 through two access operations (each access operation includes a seek operation to a distant position for writing and a seek operation for returning to an original position) is calculated and the lower limit value Tmin of the reference time t0 is set at a time whose 40% becomes the overhead time t1. When the overhead time t1 is 0.8 seconds, for instance, the lower limit value Tmin is set to two seconds because 40% of two seconds becomes 0.8 seconds. By setting the lower limit value Tmin of the reference time t0 in this manner, the overhead time t1 is secured and it becomes possible to guarantee processing performance of 60% or higher to video data. Note that as the reference time t0 is set longer than the lower limit value Tmin, the processing performance that can be attained becomes farther higher.

The reference time t0 is set to an appropriate time between the upper limit value Tmax and the lower limit value Tmin set in the manner described above. In more detail, if the upper limit value Tmax is five seconds and the lower limit value Tmin is two seconds, the reference time t0 is set to a time between these values (three seconds, for instance).

It should be noted here that the set value of the reference time t0 may be adaptively changed within a range between the lower limit value Tmin and the upper limit value Tmax in accordance with the data rate of a video dealt with and a load state. When multiple pieces of stream data are dealt with, a processing time may be calculated based on a total sum of their data rates, a range of the reference time t0 settable may be calculated based on a result of the calculation, and the reference time t0 may be increased or decreased. With this construction where the reference time t0 is increased or decreased, it becomes possible to guarantee the desired data rates of the multiple pieces of stream data and to improve the reliability of the apparatus 100 without causing a lowering of the processing performance.

Figure 5:
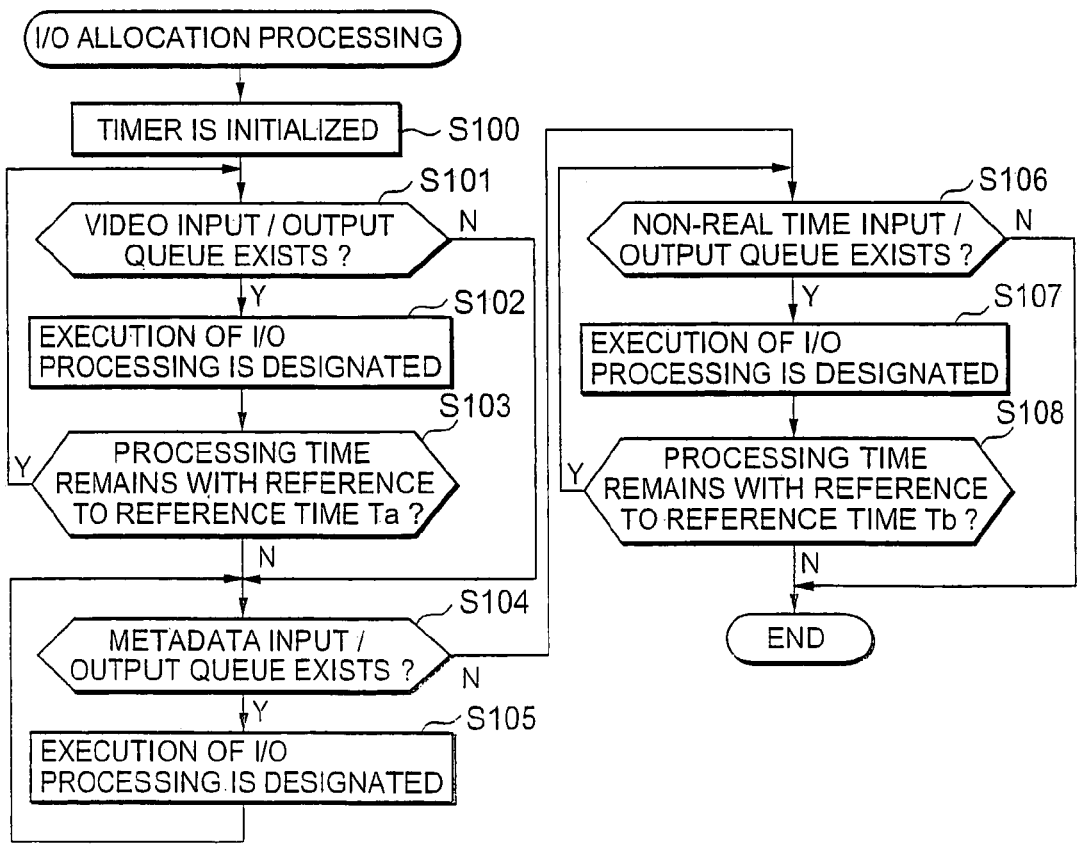
FIG. 5 is a flowchart showing I/O allocation processing.

FIG. 5 is a flowchart showing I/O allocation processing executed by the time management unit 25. The time management unit 25 sequentially fetches the data input/output commands held in the video input/output queue holding unit 22, the metadata input/output queue holding unit 23, and the non-real-time input/output queue holding unit 24 in a FIFO manner, determines an execution procedure, and informs the data input/output execution unit 26 of a result of the determination. Through the I/O allocation processing shown in FIG. 5, the processing for fetching the data input/output commands held in the respective queue holding units 22, 23, and 24 is executed.

In the I/O allocation processing, the time management unit 25 initializes a timer (hereinafter referred to as the "time management timer") that the time management unit 25 itself manages (step S100). Next, the time management unit 25 determines whether any data input/output commands (video input/output queue) exist in the video input/output queue holding unit 22 (step S101). If a video input/output queue exists, the time management unit 25 fetches each corresponding data input/output command, transmits the fetched data input/output command to the data input/output execution unit 26, and designates execution of data input/output (step S102). Also, in step S102, the time management unit 25 adds a required time of the input/output processing of video data by the data input/output execution unit 26 based on the transmitted data input/output command to the time management timer. Note that the required time of the video data input/output processing by the data input/output execution unit 26 based on the data input/output command is calculated and set in advance.

The input/output execution unit 26 executes the data input/output processing in accordance with the received data input/output command. In more detail, if the received data input/output command designates data output processing, the input/output execution unit 26 obtains corresponding video data from the file management unit 21 and executes processing for writing the video data through the disk apparatus control unit 30 onto a storage medium 40. On the other hand, if the received data input/output command designates data output processing, the input/output execution unit 26 reads corresponding video data from the storage medium 40 and executes processing for transmitting the read video data to the file management unit 21.

After the execution designation is made in step S102, the time management unit 25 determines whether a processing time remains with reference to a video data processing reference time Ta described later using the time management timer. In more detail, the time management unit 25 determines whether a value obtained by subtracting a time indicated by the time management timer from the video data processing reference time Ta is equal to or more than a required time of the input/output processing of video data by the data input/output execution unit 26 based on a data input/output command. If the obtained value is equal to or more than the required time, this means that it is possible to perform the video data input/output processing without exceeding the video data processing reference time Ta even if the data input/output command is further outputted. Consequently, the processing returns to the operation in step S101.

It should be noted here that the video data processing reference time Ta is a time, of the preset reference time t0, allocated as a time for executing the video data input/output processing. More precisely, the video data processing reference time Ta is set to a time obtained by subtracting the overhead time t1 calculated in advance from the predetermined reference time t0, that is, a time calculated and set in advance using a formula "t0-t1".

When it is judged in step S103 that there exists no remaining time that is equal to or more than the required time of the video data input/output processing or when it is judged in step S101 that no video input/output queue exists, the time management unit 25 determines whether a metadata input/output queue (data input/output commands) exists in a metadata input/output queue holding unit 23 (step S104). If a metadata input/output queue exists, the time management unit 25 fetches each data input/output command, transmits the fetched data input/output command to the input/output execution unit 26, and makes execution designation (step S105). Also, in step S105, the time management unit 25 adds a required time of the input/output processing of metadata by the data input/output execution unit 26 based on the transmitted data input/output command to the time management timer. Note that the required time of the metadata input/output processing by the data input/output execution unit 26 based on the data input/output command is calculated and set in advance.

On receiving the data input/output command, the input/output execution unit 26 executes the data input/output processing in accordance with the received data input/output command. After the execution designation is made, the processing returns to the operation in step S104. That is, the data input/output commands are fetched in order by repeating the operations in step S104 and step S105 until no metadata input/output queue remains in the metadata input/output queue holding unit 23, and the fetched data input/output commands are transmitted to the input/output execution unit 26, thereby making execution designation.

Next, the time management unit 25 determines whether a non-real-time input/output queue (data input/output commands) exists in a non-real-time input/output queue holding unit 22 (step S106). If a non-real-time input/output queue exists, the time management unit 25 fetches each data input/output command, and transmits the fetched data input/output command to the input/output execution unit 26, thereby making execution designation (step S107). Also, in step S107, the time management unit 25 adds a required time of the input/output processing of non-real-time data by the data input/output execution unit 26 based on the transmitted data input/output command to the time management timer. Note that the required time of the non-real-time data input/output processing by the data input/output execution unit 26 based on the data input/output command is calculated and set in advance.

On receiving the data input/output command, the input/output execution unit 26 executes the data input/output processing in accordance with the received data input/output command.

After the execution designation is made, the time management unit 25 determines in step S108 whether a processing time remains with reference to an overhead processing reference time Tb (=t1) using the time management timer. In more detail, the time management unit 25 determines whether a time obtained by subtracting a result of calculation, in which the reference time t0 is subtracted from a time indicated by the time management timer, from the overhead processing reference time Tb is equal to or more than a required time of the input/output processing of non-real-time data by the data input/output execution unit 26 based on a data input/output command. If the thus obtained time is equal to or more than the required time for execution, this means that it is possible to perform the non-real-time data input/output processing without exceeding the overhead processing reference time Tb even if the data input/output command is further outputted. Consequently, the processing returns to the operation in step S106.

When it is judged in step S108 that the thus obtained time is not equal to or more than the required time or when it is judged in step S106 that no non-real-time queue exists, the time management unit 25 ends the I/O allocation processing of the reference time t0. When the I/O allocation processing of the reference time t0 is ended, the next I/O allocation processing of the reference time t0 is started. That is, the I/O allocation processing described above is repeatedly executed within time cycles of the reference time t0.

It should be noted here that in the example described above, the overhead time t1 is set to the required time of the processing of data other than video data, and therefor there is not a possibility that it is judged in step S108 that no processing time remains. However, the overhead time t1 may be set to a required time of the input/output processing of metadata. In this case, the data input/output command reading processing is executed only when a remaining time exists with reference to the reference time t1 after the data input/output command reading processing. Consequently, it becomes possible to further improve the processing performance concerning the video data input/output.

Also, in the I/O allocation processing described above, after the video data input/output processing by the data input/output execution unit 26 based on the data input/output commands outputted in step S102 is completed, the time management unit 25 transits to the operation in step S104. Here, whether the video data input/output processing by the data input/output execution unit 26 is completed is confirmed by monitoring whether the required time of the video data input/output processing based on the data input/output commands has elapsed using the timer. With this construction, a postponement period, during which the reading of each data input/output command of the metadata input/output queue and each data input/output command of the non-real-time data input/output queue is halted, is increased or decreased while guaranteeing the desired data rate of stream data. As a result, it becomes possible to perform I/O processing without waste of time.

Figure 6:
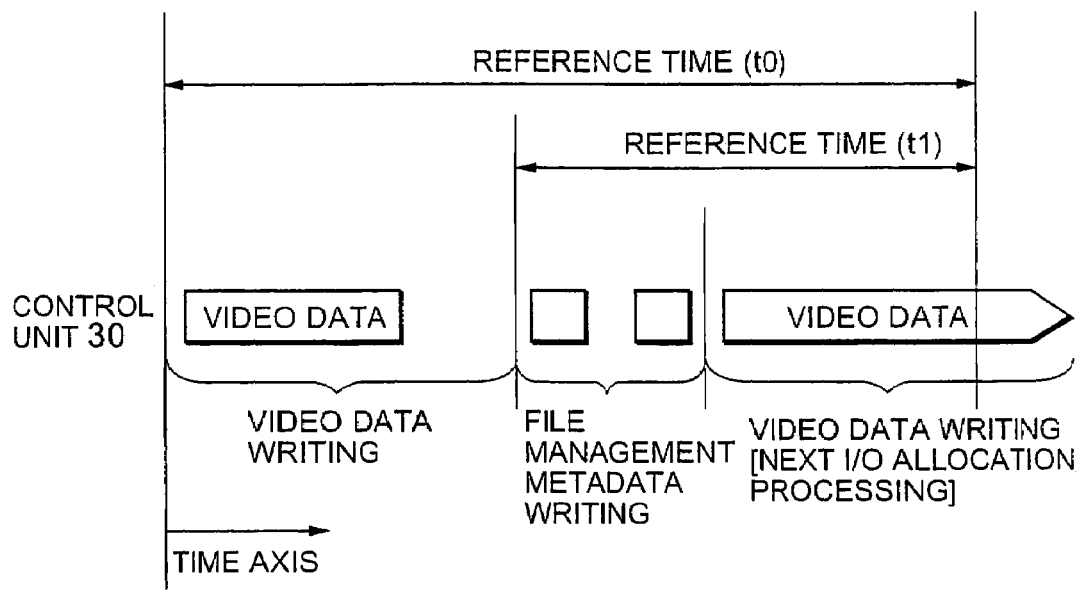
FIG. 6 is an explanatory diagram showing a state of data transfer performed based on execution designation made in the I/O allocation processing.

FIG. 6 is an explanatory diagram showing a state of data transfer performed based on execution designation made in the I/O allocation processing described above. In the example shown in FIG. 6, a recording operation of video data and a recording operation of metadata for managing the video data are executed and a recording operation of non-real-time data is not executed. Following this, although the reference time t0 has not elapsed, no I/O request remains, so that the next I/O allocation processing is started and another recording operation of the video data is executed in the newly started I/O allocation processing.

Figure 7:
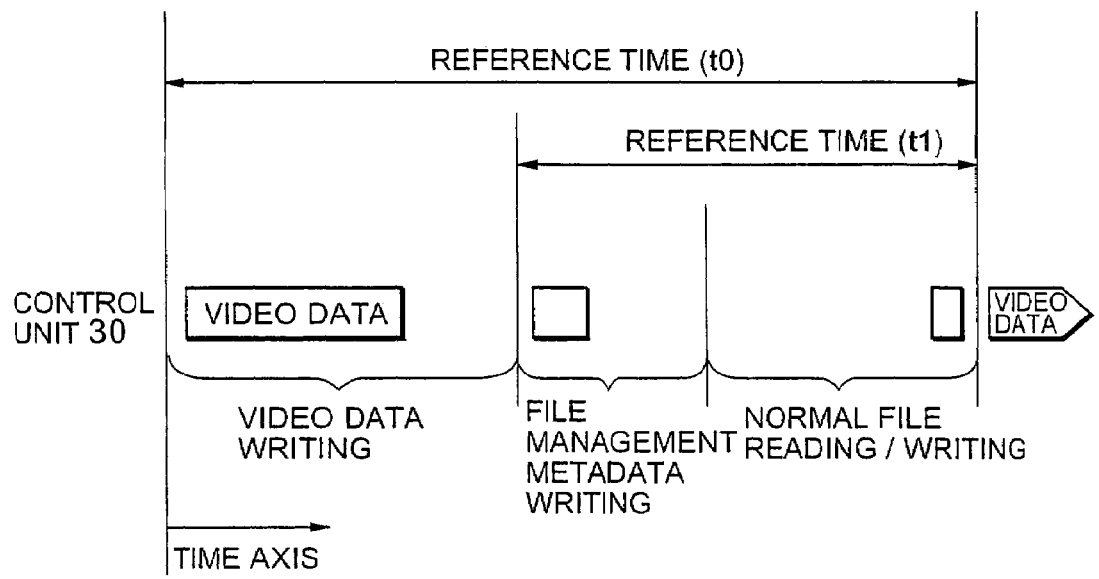
FIG. 7 is an explanatory diagram showing another the state of the data transfer performed based on the execution designation made in the I/O allocation processing.

FIG. 7 is an explanatory diagram showing another state of the data transfer performed based on the execution designation made in the I/O allocation processing described above. In the example shown in FIG. 7, a recording operation of video data, a recording operation of metadata for managing the video data, and an input/output request of a normal file that is non-real-time data are executed. In this example, as shown in FIG. 7, the writing of the metadata and the input/output of the normal file are executed in order within the reference time t0.

Figure 8:
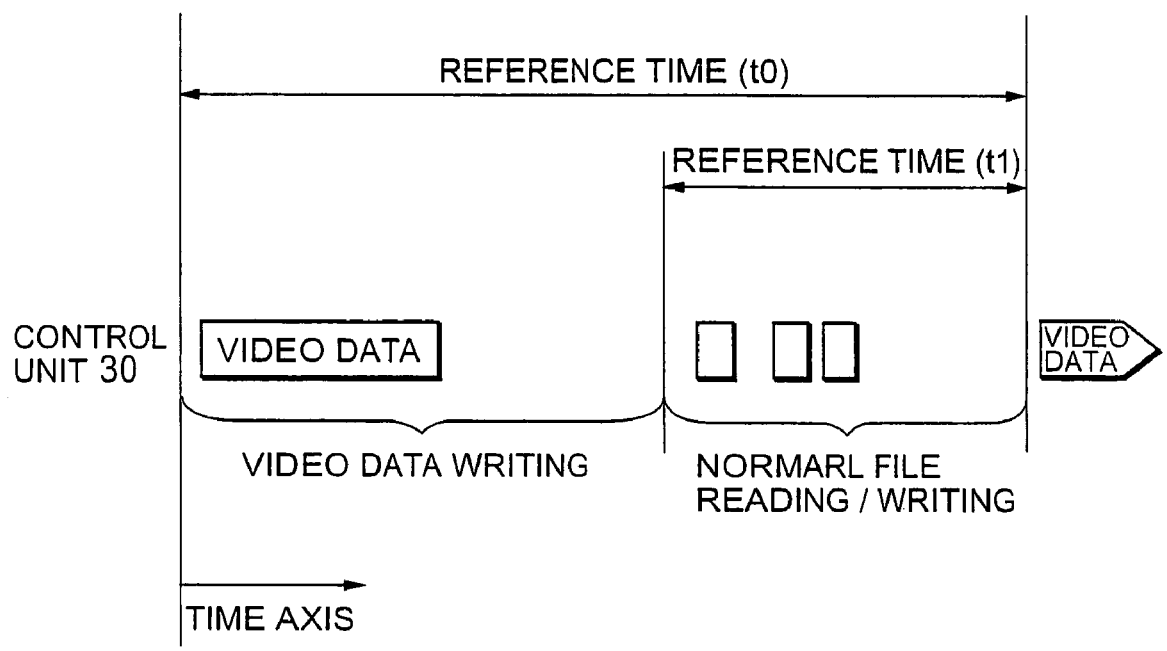
FIG. 8 is an explanatory diagram showing still another the state of the data transfer performed based on the execution designation made in the I/O allocation processing.

FIG. 8 is an explanatory diagram showing still another state of the data transfer performed based on the execution designation made in the I/O allocation processing described above. In the example shown in FIG. 8, a reproduction operation of video data and an input/output request of a normal file are executed. In this example, as shown in FIG. 8, the input/output of the normal file is executed within the reference time t0.

It should be noted here that in the example described above, it is confirmed in step S103 or step S108 whether a processing time remains. However, an upper limit may be set for the number of times of queue output in one I/O allocation processing and whether the upper limit is reached may be confirmed.

A method for determining the length of a queue (meaning the number of times of request for data input/output based on data input/output commands allowable in one access operation, that is, the number of times of transmission of the data input/output commands to the data input/output execution unit 26 in one I/O allocation processing) in the case of the construction described above will be described. One of the video input/output queue holding unit 22, the metadata input/output queue holding unit 23, and the non-real-time input/output queue holding unit 24 limits the queue length as necessary in order to set an upper limit for an input/output processing time. With this construction, when the limit number of times is reached during the reading of data input/output commands of a queue, the time management unit 25 ends the reading processing of the data input/output commands of the queue.

Next, a method for determining a queue limit length will be described. In the case of input/output commands contained in the metadata input/output queue, the size of metadata independently inputted/outputted is limited, so that it is possible to calculate in advance a processing time t2 of one metadata input/output processing from a seek time, a command processing time, and the like. Therefore, in order to surely execute the metadata input/output processing within the reference time t1, t1/t2 is set as the upper limit of the length of the metadata input/output queue (number of times of reading of the data input/output commands contained in the metadata input/output queue).

In the case of input/output commands contained in the non-real-time input/output queue, the non-real-time data input/output processing is divided and converted into multiple processing of a fixed length, a processing time t3 of one non-real-time data input/output processing is estimated, and t1/t3 is set as the upper limit of the length of the non-real-time input/output queue (number of times of reading of the data input/output commands contained in the non-real-time data input/output queue).

In the case of the input/output commands contained in the video input/output queue, the upper limit of the length of the video input/output queue may be set to "t0×v0/v1" where "v0" is a data amount per unit time that the disk apparatus control unit 30 is capable of inputting/outputting on average and "v1" is the data amount of video data used in one input/output processing calculated with consideration given to characteristics of an input/output interface of the storage medium 40. In more detail, if it is assumed that the data amount v0 is 20 Mb/s, the data amount v1 is 4 Mb/s, and t0 is five seconds, for instance, it is possible to request the data input/output commands contained in the video input/output queue up to 20/4=5 times per unit time. As a result, in this case, it is possible to request the data input/output commands up to 5×5=25 times within the reference time t0.

As described above, in the first embodiment, a construction is obtained where control concerning the establishment of synchronization at the time of the recording of video data onto the storage medium 40 is managed based on the rate of the video data and the like. As a result, it becomes possible to minimize an increase in load accompanying the synchronization operation while making use of the sequential input/output performance of the storage medium 40 (disk).

The disk recording/reproduction apparatus 100 is capable of calculating the data amount of the video data inputted/outputted per unit time based on the reproduction/recording rate of the video data and calculating a range (t0-t1) of the time Ta that should be allocated to the input/output processing of the video data. Also, even if time other than the required time of the input/output of the video data is allocated to execution of other input/output processing, no influence is exerted on the recording/reproduction of a video. Consequently, with the construction where the input/output processing of a log (non-real-time data) concerning video recording and data (metadata) for file management is allocated to a vacant time (t1) based on the rate of the video data, it becomes possible to perform control concerning the establishment of synchronization without causing a lowering of the sequential input/output performance of the storage medium 40 (disk).

More specifically, in the first embodiment described above, the rate of the video data is attained by collectively executing the data input/output processing concerning a synchronization operation or log generation in a remaining time (time t1). As a result, it becomes possible to secure an input/output time of the video data with reliability by limiting a processing time consumed by the synchronization operation or the log generation and to improve the reliability of the disk recording/reproduction apparatus 100 without causing a lowering of the processing performance.

In particular, in the case of a recording/reproduction apparatus, such as an optical disk recorder like the disk recording/reproduction apparatus 100 described above, whose random access performance is low, it becomes possible to manage data input/output concerning a synchronization operation or log generation based on the rate of video data, which makes it possible to minimize an increase in load accompanying the synchronization operation or the log generation while making use of the sequential input/output performance of a disk more effectively.

Second Embodiment

Figure 9:
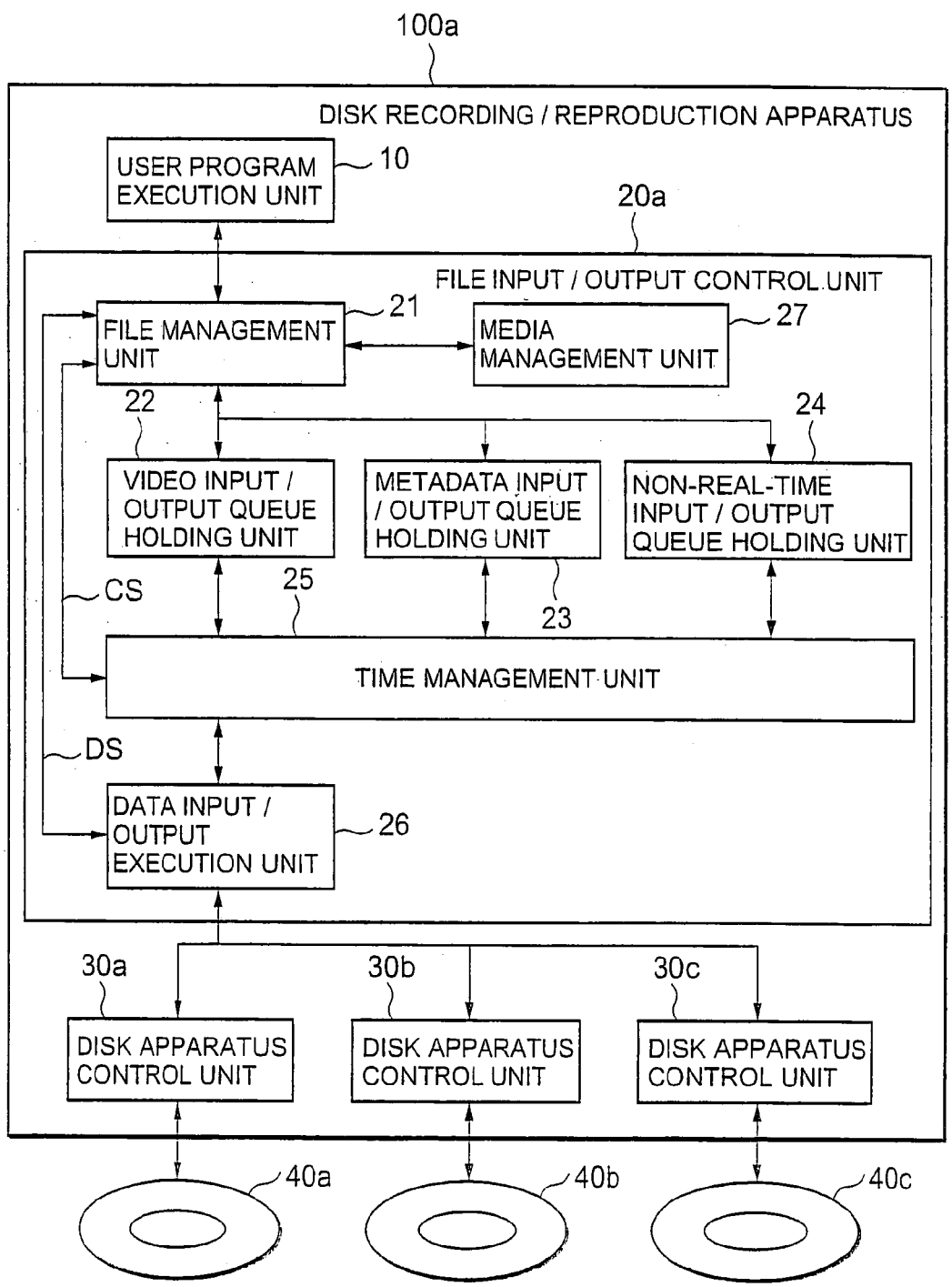
FIG. 9 is a block diagram showing a construction of a disk recording/reproduction apparatus in a second embodiment of the present invention.

FIG. 9 is a block diagram showing a construction of a disk recording/reproduction apparatus 10*a* in a second embodiment of the present invention. In the following description, each unit that has the same construction and performs the same processing as in the case of the disk recording/reproduction apparatus 100 in the first embodiment described above is given the same reference numeral and the detailed description thereof will be omitted in this second embodiment.

The disk recording/reproduction apparatus 100*a* includes a user program execution unit 10, a file input/output control unit 20*a*, and disk apparatus control units 30*a*, 30*b*, and 30*c*.

The disk recording/reproduction apparatus 100*a* includes a mechanism for loading storage media 40*a*, 40*b*, and 40*c* and executes recording processing for recording data onto the storage media 40*a*, 40*b*, and 40*c* and a function of executing reproduction processing for reading the recorded data from the storage media 40*a*, 40*b*, and 40*c* and reproducing the read data. In this embodiment, the disk recording/reproduction apparatus 100*a* is assumed as an apparatus (optical disk apparatus, for instance) that performs recording/reproduction processing onto/from the storage media 40*a*, 40*b*, and 40*c* whose data writing and reading speeds are relatively low. Note that the relatively low-speed storage media 40*a*, 40*b*, and 40*c* each mean a storage medium, such as an optical disk, whose processing speed is low as compared with a storage medium such as a magnetic disk, whose processing speed is relatively high. In more detail, the relatively low-speed storage media 40*a*, 40*b*, and 40*c* each mean a storage medium whose processing with an average access time of 100 [ms] is difficult, an optical disk, for instance. Note that in the following description, it is assumed that video data to be inputted/outputted is dealt with as data that requires real-time processing.

It should be noted here that in this embodiment, a construction is obtained where processing with respect to the three storage media 40*a*, 40*b*, and 40*c* is performed, although the number of the storage media is not limited to this and may be decreased to two or increased to four or more.

The file input/output control unit 20*a* includes a media management unit 27 and the same units as in the case of the file input/output control unit 20 described above. On receiving a file input/output command, in order to execute reading/writing of a corresponding file, a file management unit 21 reads media management information from specific addresses on the storage media 40*a*, 40*b*, and 40*c* and stores the read media management information in the media management unit 27.

The media management unit 27 informs the file management unit 21 of identification information (media identification information) of the storage media 40*a*, 40*b*, and 40*c* holding data that is the target of input/output, file identification information for identifying the physical arrangement of the input/output target data, and identification information (control unit identification information) of the disk apparatus control units 30*a*, 30*b*, and 30*c* that respectively read/write data from/onto the storage media 40*a*, 40*b*, and 40*c*. With the media identification information, the file identification information, and the control unit identification information are contained in the media management information. The file management unit 21 specifies the physical arrangement of data identified by the file identification information with reference to an area management table held in a management unit memory.

A data input/output execution unit 26 selects one of the disk apparatus control units 30*a*, 30*b*, and 30*c* in response to a received data input/output command, generates an input/output execution command, and outputs the generated input/output execution command and data to be inputted/outputted to the selected one of the disk apparatus control units 30*a*, 30*b*, and 30*c*, thereby executing data input/output through the disk apparatus control unit 30*a*, 30*b*, or 30*c*. Note that the data input/output execution unit 26 performs the sending/reception of the data to be inputted/outputted to/from the file management unit 21 using a data signal. Also, note that data that is the target of reading/writing is stored in the memory in the file management unit 21 or a memory in the user program execution unit 10.

FIG. 10 is an explanatory diagram showing a data structure of file management data used in the second embodiment. As shown in FIG. 10, in this example, the file management data includes an attribute, a file name, a date, a file size, a division size, the number of divisions, an area length, and the like. The "attribute", the "file name", the "date", and the "file size" are the same as those shown in FIG. 3 described above.

Also, in this example, an area, from/into which data is to be read/written, is divided across the multiple storage media 40a, 40b, and 40c. Therefore, as shown in FIG. 10, the "division size" showing the size of each divided piece of data, the "number of divisions" showing the number of the storage media across which the data is divided, and the "area length" showing the entire length of the areas of the multiple storage media, across which the data is divided, are contained in the file management data. Also, the file management data includes media identification information (medium #0 to medium #3, a case where four or more storage media are used is shown in this example) showing a storage medium that is the storage destination of each divided piece of data and file identification information showing the physical arrangement of the divided piece of data (in more detail, its start address on the storage destination). The number of pairs of the media identification information and the file identification information set in the file management data is equal to the number of divisions.

It should be noted here that while division processing for dividing data that is the target of input/output across the respective storage media 40a, 40b, and 40c is executed, in the case where storage areas of the divided pieces of data become discontinuous, or when the number of storage media storing the divided pieces of data is changed, area management is performed by resetting the division size, the number of divisions, the area length, the media identification information, and the file identification information.

Next, an input/output operation of the disk recording/reproduction apparatus 10a in the second embodiment will be described.

Figure 11:
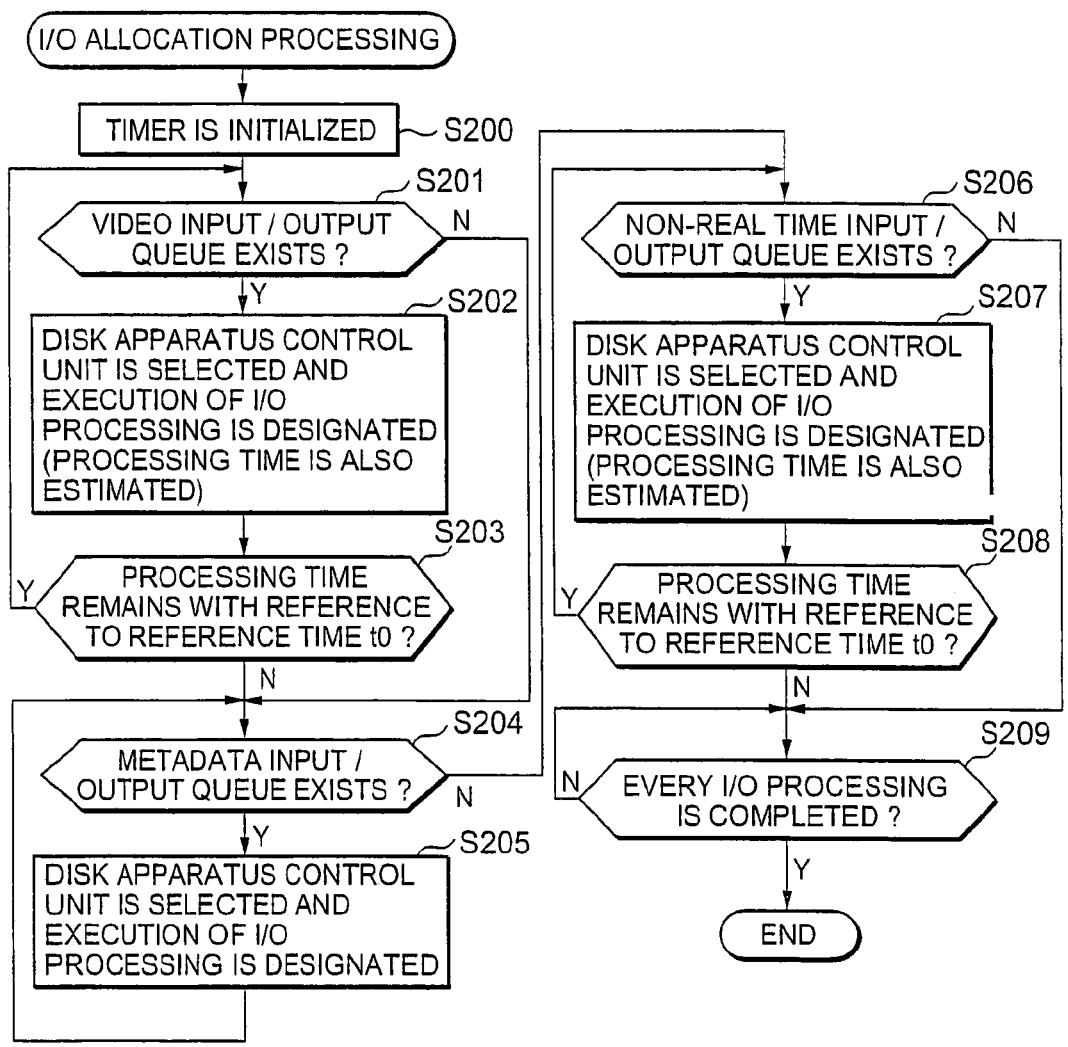
FIG. 11 is a flowchart showing I/O allocation processing in the second embodiment.

FIG. 11 is a flowchart showing I/O allocation processing executed by the time management unit 25 in this embodiment. The time management unit 25 sequentially fetches the data input/output commands held in the video input/output queue holding unit 22, the metadata input/output queue holding unit 23, and the non-real-time input/output queue holding unit 24 in a FIFO manner, determines an execution procedure, and informs the data input/output execution unit 26 of a result of the determination. Through the I/O allocation processing shown in FIG. 11, the processing for fetching the data input/output commands held in the respective queue holding units 22, 23, and 24 is executed.

In the I/O allocation processing, the time management unit 25 initializes a timer (hereinafter referred to as the "time management timer") that the time management unit 25 itself manages (step S200). Next, the time management unit 25 determines whether any data input/output commands exist in the video input/output queue holding unit 22 (step S201).

If any data input/output commands exist, the time management unit 25 fetches each data input/output command, selects a disk apparatus control unit (any one of the disk apparatus control units 30a, 30b, and 30c) that is not designated to execute the input/output of video data by the input/output execution unit 26 in previous I/O allocation processing, transmits the fetched data input/output command along with information showing a result of the selection to the input/output execution unit 26, and designates execution of data input/output (step S202).

Also, in step S202, the time management unit 25 adds a required time of the input/output processing of the video data by the data input/output execution unit 26 based on the transmitted data input/output command to the time management timer. Note that the required time of the video data input/output processing by the data input/output execution unit 26 based on the data input/output command is calculated and set in advance.

The selection of the disk apparatus control unit 30 in step S202 is performed in accordance with predetermined priorities. For instance, the highest priority, the second highest priority, and the lowest priority are respectively given to the disk apparatus control unit 30a, the disk apparatus control unit 30b, and the disk apparatus control unit 30c in advance, and the disk apparatus control unit 30a, the disk apparatus control unit 30b, and the disk apparatus control unit 30c are sequentially selected in this order each time the I/O allocation processing is executed.

The input/output execution unit 26 executes the data input/output processing in accordance with the received data input/output command contained in the video input/output queue. More precisely, if the received data input/output command designates data output processing, the input/output execution unit 26 obtains corresponding video data from the file management unit 21 and executes processing for writing the video data through the disk apparatus control unit (one of the disk apparatus control units 30a, 30b, and 30c selected by the time management unit 25) onto a storage medium (one of the storage media 40a, 40b, and 40c corresponding to the disk apparatus control unit selected by the time management unit 25). On the other hand, if the received data input/output command designates data output processing, the input/output execution unit 26 reads corresponding video data from the storage medium (one of the storage media 40a, 40b, and 40c corresponding to the disk apparatus control unit selected by the time management unit 25) and executes processing for transmitting the read video data to the file management unit 21.

After the execution designation is made in step S202, the time management unit 25 determines whether a processing time remains with reference to the reference time t0 using the time management timer. In more detail, the time management unit 25 determines whether a value obtained by subtracting a time indicated by the time management timer from the reference time t0 is equal to or more than a required time of the input/output processing of video data by the data input/output execution unit 26 based on a data input/output command. If the thus obtained value is equal to or more than the required time, this means that it is possible to perform the video data input/output processing without exceeding the reference time t0 even if the data input/output command is further outputted. Consequently, the processing returns to the operation in step S201.

When it is judged in step S203 that there exists no remaining time that is equal to or more than the required time of the video data input/output processing or when it is judged in step S201 that no data input/output command exists, the time management unit 25 initializes the time management timer and determines whether a metadata input/output queue (data input/output commands) exists in a metadata input/output queue holding unit 23 (step S204). If a metadata input/output queue exists, the time management unit 25 fetches each data input/output command, selects a disk apparatus control unit (disk apparatus control unit 30b, for instance) other than a disk apparatus control unit (disk apparatus control unit 30a, for instance) selected at the time of the data input/output command transmission in step S202, transmits the fetched data input/output command along with information showing a result of the selection to the input/output execution unit 26, and makes execution designation (step S205). Also, in step S205, the time management unit 25 adds a required time of the input/output processing of metadata by the data input/output execution unit 26 based on the transmitted data input/output command to the time management timer. Note that the required time of the metadata input/output processing by the data input/output execution unit 26 based on the data input/output command is calculated and set in advance.

On receiving the data input/output command, the data input/output execution unit 26 executes the data input/output processing in accordance with the received data input/output command. After the execution designation is made, the processing returns to the operation in step S204. That is, the data input/output commands are fetched in order by repeating the operations in step S204 and step S205 until no data input/output command remains in the metadata input/output queue holding unit 23, and the fetched data input/output commands are transmitted to the data input/output execution unit 26, thereby making execution designation.

Next, the time management unit 25 determines whether a non-real-time input/output queue (data input/output commands) exists in a non-real-time input/output queue holding unit 22 (step S206). If a non-real-time input/output queue exists, the time management unit 25 fetches each data input/output command, selects a disk apparatus control unit (disk apparatus control unit 30b, for instance) other than a disk apparatus control unit (disk apparatus control unit 30a, for instance) selected at the time of the data input/output command transmission in step S202, and transmits the fetched data input/output command along with information showing a result of the selection to the input/output execution unit 26, thereby making execution designation (step S207). Also, in step S207, the time management unit 25 adds a required time of the input/output processing of non-real-time data by the data input/output execution unit 26 based on the transmitted data input/output command to the time management timer. Note that the required time of the non-real-time data input/output processing by the data input/output execution unit 26 based on the data input/output command is calculated and set in advance.

On receiving the data input/output command, the input/output execution unit 26 executes the data input/output processing in accordance with the received data input/output command.

After the execution designation is made in step S207, the time management unit 25 determines whether a processing time remains with reference to the reference time t0 using the time management timer. In more detail, the time management unit 25 determines whether a time obtained by subtracting a time indicated by the time management timer from the reference time t0 is equal to or more than a required time of the input/output processing of non-real-time data by the data input/output execution unit 26 based on a data input/output command. If the thus obtained time is equal to or more than the required time for execution, this means that there remains an execution time of the non-real-time data input/output processing even if the data input/output command is further transmitted. Consequently, the processing returns to the operation in step S206.

When it is judged in step S208 that the thus obtained time is not equal to or more than the required time or when it is judged in step S206 that no non-real-time queue exists, it is determined whether every I/O processing is completed (step S209). In more detail, it is determined whether the reference time t0 has elapsed since the start of the I/O allocation processing. This is because if the reference time t0 has elapsed, every I/O processing should have been completed.

If it is determined that every I/O processing is completed, the time management unit 25 ends the I/O allocation processing. When the I/O allocation processing is ended, the next I/O allocation processing is started. That is, the I/O allocation processing described above is repeatedly executed at time cycles of the reference time t0.

It should be noted here that in the I/O allocation processing shown in FIG. 11 described above, the data input/output execution unit 26 executes processing with respect to the multiple storage media 40a, 40b, and 40c through the multiple disk apparatus control units 30a, 30b, and 30c in parallel in accordance with received data input/output commands.

Figure 12:
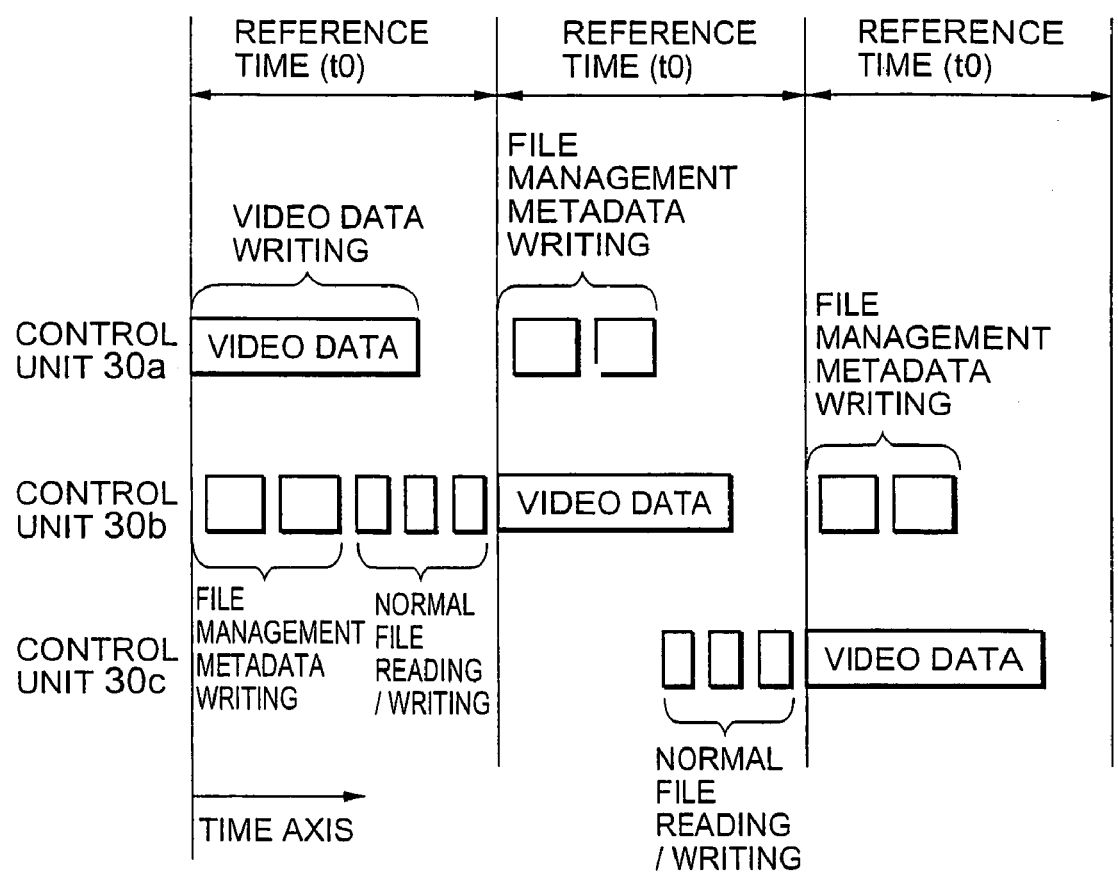
FIG. 12 is an explanatory diagram showing a state of data transfer performed based on execution designation made in the I/O allocation processing in the second embodiment.

FIG. 12 is an explanatory diagram showing a state of data transfer performed through execution of the I/O allocation processing shown in FIG. 11. As shown in FIG. 12, the three disk apparatus control units 30a, 30b, and 30c exist and the respective disk apparatus control units 30a, 30b, and 30c operate in parallel. Also, as shown in FIG. 12, in this example, the execution of video data input/output is allocated to the respective disk apparatus control units 30a, 30b, and 30c in order of priorities, the input/output processing of other data is allocated to a disk apparatus control unit that is not allocated to the video data input/output processing, that is to say, the video data input/output processing and the other data input/output processing are executed in parallel.

It should be noted here that, in a like manner, during reading of video data, it is possible to execute the video data reading and non-real-time data input/output in parallel using the multiple disk apparatus control units 30a, 30b, and 30c.

As described above, in the second embodiment described above, the disk recording/reproduction apparatus 100a provided with the mechanism for loading the multiple storage media 40 has a construction where a recording operation of data (video data) having higher importance is assigned a disk access right with a higher priority, so that it becomes possible to prevent the loss of data at the time of recording and to construct a disk recording/reproduction apparatus that has high reliability and is easy to use.

If a delay in processing occurs during a recording operation of a video, data will be lost and the complete reproduction of the data becomes impossible. On the other hand, even if a delay in processing occurs during reproduction, it is possible to take a countermeasure where, for instance, reproduction quality is lowered by simplifying processing (by reducing the number of frames of a video and processing only audio, for instance). This means that when recording and reproduction are performed at the same time, it is rational that a higher priority is given to the processing on a recording side. In the second embodiment described above, it is possible to manage the allocation of the I/O processing right to video input/output, so that it becomes possible to perform I/O control in which a higher priority is given to a recording operation and to construct a disk recording/reproduction apparatus that is easy to use.

Also, in the second embodiment described above, in a recording/reproduction apparatus, such as an optical disk recorder, whose random access performance is low, a construction is obtained where I/O scheduling is performed based on the importance of data, so that it becomes possible to increase processing efficiency under an environment where the recording/reproduction processing of real-time data, such as video data, coexists with the input/output of another file and to improve the function of the disk recording/reproduction apparatus.

It should be noted here that although not described in the second embodiment described above, there may be obtained a construction where when data is divided across multiple storage media and the divided pieces of data are recorded or reproduced in order, a fixed value showing a fixed data amount for division across the multiple storage media (for instance, the files corresponding to the file identification information shown in FIG. 10 are set so as to have the fixed amount) is preset based on the data rate of stream data and recording or reproduction is performed while performing switching among the storage media at cycles of the fixed value. With this construction, it becomes possible to smoothly perform processing for dividing data and recording the divided pieces of data and processing for performing reproduction based on the divided pieces of data, which makes it possible to make effective use of the multiple storage media. Note that there may be realized a construction where a fixed time (reproduction time or recording time) is predetermined in place of the fixed data amount and the switching among the storage media is performed at cycles of the fixed time.

Also, in the second embodiment described above, there has been described a construction where the I/O allocation processing is performed based on the reference time t0. However, the reference time t0 may be set as the video data processing reference time Ta. Even with this construction, it is possible to secure a time for performing the recording/reproduction of video data without causing data loss.

It should be noted here that in each embodiment described above, there has been described a case where the relatively low-speed storage media 40, 40a, 40b, and 40c are dealt with, although the present invention may be applied to a recording/reproduction apparatus (hard disk drive, for instance) that deals with high-speed storage media such as magnetic disks (hard disks, for instance).

Also, each embodiment described above has been explained by taking video data as an example of the data that requires real-time processing, although the present invention is also applicable to other data, such as audio data, so long as the data may be processed in real-time processing.

Also, in each embodiment described above, there has been described a construction where one video input/output queue holding unit 22 is provided, although there may be obtained a construction where multiple video input/output queue holding units are provided. In this case, data input/output commands to be placed in video input/output queues are classified with reference to video data rates, higher priorities are given to data input/output commands corresponding to higher data rates, priorities are also set for the multiple video input/output queue holding units, and the data input/output commands corresponding to the higher data rates are placed in the video input/output queue holding units having higher priorities. Also, when data input/output commands are held in the multiple video input/output queue holding units, the time management unit 25 reads the data input/output commands held in the video input/output queue holding unit having a higher priority first. Also, in this case, writing processing to a storage medium may be performed when a fixed amount of data input/output commands is accumulated (at a point of time when the video input/output queue holds the fixed amount of data input/output commands). With the construction described above, the input/output requests corresponding to lower rates are retained in the queue holding units 23 and 24, so that it becomes possible to increase a probability that processing will be collectively executed, which makes it possible to improve the efficiency of the disk recording/reproduction apparatus itself.

Also, although not specifically described in each embodiment described above, a control program (recording/reproduction processing program) for executing recording of information onto a storage medium and reproduction of the information recorded on the storage medium is installed on the disk recording/reproduction apparatuses 100 and 100a. Each unit constituting the disk recording/reproduction apparatuses 100 and 100a executes various kinds of control in accordance with the recording/reproduction processing program. That is, the recording/reproduction processing program is a recording/reproduction program for causing, for example, the disk recording/reproduction apparatus to execute: classification processing for classifying each request from a recording/reproduction control means into any one of a request for input/output of stream data to be applied to real-time processing, a request for input/output of metadata, and a request for input/output of non-real-time data not to be applied to real-time processing; accumulation processing for sequentially accumulating each classified input/output request in an input/output request accumulation means; reading processing for, when any input/output requests are accumulated in the input/output request accumulation means, sequentially reading each accumulated input/output request in accordance with a predetermined reference time; and input/output processing for, in response to each read input/output request, executing input/output processing with respect to a storage medium, and during the reading processing, in order to attain a desired data rate of the stream data, the computer is caused to postpone processing for reading each metadata input/output request for a fixed period specified by the reference time and to collectively execute the postponed metadata input/output request reading processing.

Further, the recording/reproduction program is a recording/reproduction program for causing, for example, the disk recording/reproduction apparatus to execute: classification processing for classifying each request from a recording/reproduction control means into any one of a request for input/output of stream data to be applied to real-time processing, a request for input/output of metadata, and a request for input/output of non-real-time data not to be applied to real-time processing; accumulation processing for sequentially accumulating each classified input/output request in an input/output request accumulation means; reading processing for, when any input/output requests are accumulated in the input/output request accumulation means, sequentially reading each accumulated input/output request in accordance with a predetermined reference time; and input/output processing for, in response to each read input/output request, executing input/output processing with respect to a storage medium, and during the reading processing, in order to attain a desired data rate of the stream data, the computer is caused to postpone processing for reading each non-real-time data input/output request for a fixed period specified by the reference time and to collectively execute the postponed non-real-time data input/output request reading processing.

As described above, according to the present invention, a construction is obtained where control concerning establishment of synchronization at the time of recording of video data onto a storage medium is managed based on the rate of video data or the like. As a result, it becomes possible to minimize an increase in load accompanying the synchronization operation while making use of the sequential input/output performance of the storage medium.

Also, according to the present invention, in a recording/reproduction apparatus having a mechanism for loading multiple storage media, a construction is obtained where a recording operation of data having higher importance is given a disk access right with a higher priority. As a result, it becomes possible to prevent the loss of data at the time of recording and to construct a disk recording/reproduction apparatus that has high reliability and is easy to use.

It will be obvious to those having skill in the art that many changes may be made in the above-described details of the preferred embodiments of the present invention. The scope of the present invention, therefore, should be determined by the following claims.

What is claimed is:

1. A data recording and reproduction apparatus comprising:
    a recording/reproduction controller that controls recording and reproduction of information;
    a request classifier that classifies each request from the recording/reproduction controller into any one of a real-time processing data request, a metadata request, and a non-real-time data request;
    an input/output request accumulator that sequentially accumulates each classified input/output request;
    an input/output request readout device that, when any input/output requests are accumulated in the input/output request accumulator, sequentially reads out each accumulated input/output request in accordance with a predetermined reference time; and
    an input/output execution unit that, in response to each input/output request read by the input/output request readout device, executes input/output processing with respect to a storage medium,
    wherein, in order to attain a desired data rate of the real-time processing data, the input/output request readout device delays reading out a metadata input/output request for a fixed period specified by the reference time and collectively executes processing of a delayed metadata input/output request with a subsequent metadata input/output request.

2. A data recording and reproduction apparatus according to claim 1,
    wherein a delay period, during which writing or reading of the metadata is halted, is increased or decreased within a range in which the desired data rate of the real-time processing data is attained.

3. A recording and reproduction apparatus according to claims 2,
    wherein the input/output request accumulator includes:
    a real-time processing data input/output queue holder that holds each real-time processing data input/output request;
    a metadata input/output queue holder that holds each metadata input/output request; and
    a non-real-time data queue holder that holds each non-real-time data input/output request,
    wherein the request classifier classifies each input/output request based on contents of a corresponding recording/reproduction request from the recording/reproduction controller and stores each classified input/output request in any one of the real-time processing data input/output queue holder, the metadata input/output queue holder, and the non-real-time data queue holder in accordance with a result of the classification, and
    when any input/output requests are accumulated in any of the real-time processing data input/output queue holder, the metadata input/output queue holder, and the non-real-time data queue holder, the input/output request readout device sequentially reads out each accumulated input/output request in accordance with the reference time.

4. A recording and reproduction apparatus according to claims 1,
    wherein the input/output request accumulator includes:
    a real-time processing data input/output queue holder that holds each real-time processing data input/output request;
    a metadata input/output queue holder that holds each metadata input/output request; and
    a non-real-time data queue holder that holds each non-real-time data input/output request,
    the request classifier that classifies each input/output request based on contents of a corresponding recording/reproduction request from the recording/reproduction controller and stores each classified input/output request in any one of the real-time processing data input/output queue holder, the metadata input/output queue holder, and the non-real-time data queue holder in accordance with a result of the classification, and
    when any input/output requests are accumulated in any of the real-time processing data input/output queue holder, the metadata input/output queue holder, and the non-real-time data queue holder, the input/output request readout device sequentially reads out each accumulated input/output request in accordance with the reference time.

5. A recording and reproduction apparatus according to claim 1,
    wherein a processing amount per unit time for carrying out input/output of the metadata is set based on an input/output processing time required by input/output of the stream data, and
    a number of times of metadata input/output request reading is limited based on the processing amount.

6. A recording and reproduction apparatus according to claim 1,
    wherein a processing amount per unit time for carrying out input/output of the non-real-time data other than video data is set based on an input/output processing time required by input/output of the video data, and
    a number of times of non-real-time data input/output request reading is limited based on the processing amount.

7. A data recording and reproduction apparatus comprising:
    a recording/reproduction controller that controls recording and reproduction of information;
    a request classifier that classifies each request from the recording/reproduction controller into any one of a real-time processing data request, a metadata request, and a non-real-time data request;
    an input/output request accumulator that sequentially accumulates each classified input/output request;
    an input/output request readout device that, when any input/output requests are accumulated in the input/output request accumulator, sequentially reads out each accumulated input/output request in accordance with a predetermined reference time; and
    an input/output execution unit that, in response to each input/output request read by the input/output request readout device, executes input/output processing with respect to a storage medium,
    wherein, in order to attain a desired data rate of the real-time processing data, the input/output request readout device delays reading out a non-real-time data input/output request for a fixed period specified by the reference time and collectively executes processing of a delayed metadata input/output request with a subsequent metadata input/output request.

8. A recording and reproduction apparatus according to claim 7,
wherein a delay period, during which writing or reading of the non-real-time data is halted, is increased or decreased within a range in which the desired data rate of the real-time processing data is attained.

9. A recording and reproduction apparatus according to claims 8,
wherein the input/output request accumulator includes:
a real-time processing data input/output queue holder that holds each real-time processing data input/output request;
a metadata input/output queue holder that holds each metadata input/output request; and
a non-real-time data queue holder that holds each non-real-time data input/output request,
the request classifier that classifies each input/output request based on contents of a corresponding recording/reproduction request from the recording/reproduction controller and stores each classified input/output request in any one of the real-time processing data input/output queue holder, the metadata input/output queue holder, and the non-real-time data queue holder in accordance with a result of the classification, and
when any input/output requests are accumulated in any of the real-time processing data input/output queue holder, the metadata input/output queue holder, and the non-real-time data queue holder, the input/output request readout device sequentially reads out each accumulated input/output request in accordance with the reference time.

10. A recording and reproduction apparatus according to claims 7,
wherein the input/output request accumulator includes:
a real-time processing data input/output queue holder that holds each real-time processing data input/output request;
a metadata input/output queue holder that holds each metadata input/output request; and
a non-real-time data queue holder that holds each non-real-time data input/output request,
wherein the request classifier classifies each input/output request based on contents of a corresponding recording/reproduction request from the recording/reproduction controller and stores each classified input/output request in any one of the real-time processing data input/output queue holder, the metadata input/output queue holder, and the non-real-time data queue holder in accordance with a result of the classification, and
when any input/output requests are accumulated in any of the real-time processing data input/output queue holder, the metadata input/output queue holder, and the non-real-time data queue holder, the input/output request readout device sequentially reads out each accumulated input/output request in accordance with the reference time.

11. A recording and reproduction apparatus according to claim 7,
wherein a processing amount per unit time for carrying out input/output of the metadata is set based on an input/output processing time required by input/output of the stream data, and
a number of times of metadata input/output request reading is limited based on the processing amount.

12. A recording and reproduction apparatus according to claim 7,
wherein a processing amount per unit time for carrying out input/output of the non-real-time data other than video data is set based on an input/output processing time required by input/output of the video data, and
a number of times of non-real-time data input/output request reading is limited based on the processing amount.

13. A data recording and reproduction apparatus comprising:
a recording/reproduction controller that controls recording and reproduction of information;
a request classifier that classifies each request from the recording/reproduction controller into any one of a real-time processing data request, a metadata request, and a non-real-time data request;
an input/output request accumulator that sequentially accumulates each classified input/output request;
an input/output request readout device that, when any input/output requests are accumulated in the input/output request accumulator, sequentially reads out each accumulated input/output request in accordance with a predetermined reference time; and
an input/output execution unit that, in response to each input/output request read by the input/output request readout device, executes input/output processing with respect to a storage medium,
wherein the input/output request accumulator includes:
a plurality of real-time processing data input/output queue holder hold each real-time processing data input/output request;
a metadata input/output queue holder holds metadata input/output request; and
a non-real-time data queue holder holds each non-real-time data input/output request,
when a classified input/output request is a real-time processing data input/output request, the input/output request accumulator selects one of the plurality of real-time processing data input/output queue holder in accordance with predetermined priorities and executes processing for accumulating the input/output request in the selected real-time processing data input/output queue holder, and
when any input/output requests are held in the plurality of input/output queue holder, the input/output request readout device reads out each input/output request in order of priorities, halts processing for reading each input/output request corresponding to a low desired data rate until a fixed period has elapsed or a fixed data amount of input/output requests is accumulated, and executes processing for sorting out each input/output request accumulated during the halt and collectively reading each sorted-out input/output request.

14. A recording and reproduction apparatus according to claim 13,
wherein, when a plurality of pieces of real-time processing data are to be recorded or reproduced, a processing time per unit time is calculated for each piece of real-time processing data based on a data rate thereof, and a period for halting writing or reading of the metadata is increased or decreased based on a total sum of the processing times so that desired data rates of the real-time processing data are attained.

15. A recording and reproduction apparatus according to claim 14, wherein, when a plurality of pieces of real-time processing data are to be recorded or reproduced, a processing time per unit time is calculated for each piece of real-time processing data based on a data rate thereof, and a period for halting writing or reading of the metadata is increased or decreased based on a total sum of the processing times so that desired data rates of the real-time processing data are attained.

16. A recording and reproduction apparatus according to claim 13, wherein, when a plurality of pieces of real-time processing data are to be recorded or reproduced, a processing time per unit time is calculated for each piece of real-time processing data based on a data rate thereof, and a period for halting writing or reading of the metadata is increased or decreased based on a total sum of the processing times so that desired data rates of the real-time processing data are attained.

17. A recording and reproduction apparatus according to claim 13, wherein a processing amount per unit time for carrying out input/output of the metadata is set based on an input/output processing time required by input/output of the stream data, and a number of times of metadata input/output request reading is limited based on the processing amount.

18. A recording and reproduction apparatus according to claim 13, wherein a processing amount per unit time for carrying out input/output of the non-real-time data other than video data is set based on an input/output processing time required by input/output of the video data, and a number of times of non-real-time data input/output request reading is limited based on the processing amount.

19. A recording/reproduction apparatus comprising:

a recording/reproduction controller that controls recording and reproduction of information;

a request classifier that classifies each request from the recording/reproduction controller into any one of a real-time processing data request, a metadata request, and a non-real-time data request;

an input/output request accumulator that sequentially accumulates each classified input/output request;

an input/output request readout device that, when any input/output requests are accumulated in the input/output request accumulator, sequentially reads out each accumulated input/output request in accordance with a predetermined reference time;

an input/output execution designator, in response to each input/output request read by the input/output request readout device that designates execution of input/output processing with respect to a storage medium; and a plurality of storage medium controller that respectively control input/output of information with respect to a plurality of storage media, wherein in response to each real-time processing data input/output request, the input/output execution designator selects one of the plurality of storage medium controller, designates execution of input/output processing of the real-time processing data, and executes writing or reading while performing switching among the storage medium controller in order at cycles of a fixed time or a fixed data amount, and in response to each metadata input/output request or each non-real-time data input/output request, the input/output execution designator selects one of the storage medium controller that is not designated to execute the real-time processing data input/output, and designates execution of input/output processing specified by the metadata input/output request or the non-real-time data input/output request.

20. A recording and reproduction apparatus according to claim 19, wherein, when data is divided across the plurality of storage media and divided pieces of data are recorded or reproduced in order, a fixed value indicating the fixed time or the fixed data amount for division across the plurality of storage media predetermined based on a data rate of the real-time processing data is set and recording or reproduction is executed while performing switching among the storage media at cycles of the fixed value.

21. A data recording and reproduction method comprising:

classifying each request from a recording/reproduction controller into any one of a request for input/output of real-time processing data, a request for input/output of metadata, and a request for input/output of non-real-time data not to be applied to real-time processing;

sequentially accumulating each classified input/output request in an input/output request accumulator;

when any input/output requests are accumulated in the input/output request accumulator sequentially reading out each accumulated input/output request in accordance with a predetermined reference time; and executing input/output processing in response to each read input/output request, with respect to a storage medium, wherein during the readout processing, in order to attain a desired data rate of the real-time processing data, processing for reading out each metadata input/output request is delayed for a fixed period specified by the reference time and the delayed metadata input/output request readout processing is collectively executed.

22. A data recording and reproduction method comprising:

classifying each request from a recording/reproduction controller into any one of a request for input/output of real-time processing data, a request for input/output of metadata, and a request for input/output of non-real-time data not to be applied to real-time processing;

sequentially accumulating each classified input/output request in an input/output request accumulator;

when any input/output requests are accumulated in the input/output request accumulator, sequentially reading out each accumulated input/output request in accordance with a predetermined reference time; and executing input/output processing in response to each read input/output request, with respect to a storage medium, wherein during the readout processing each non-real-time data input/output request is delayed for a fixed period specified by the reference time and the delayed non-real-time data input/output request readout processing is collectively executed.

23. A data recording and reproduction program stored in a computer-usable medium for executing recording of information onto a storage medium and reproduction of the information recorded on the storage medium, said program, when executed by a computer, causing said computer to:

classify each request from a recording/reproduction controller into any one of a request for input/output of real-time processing data, a request for input/output of metadata, and a request for input/output of non-real-time data not to be applied to real-time processing;

sequentially accumulate each classified input/output request in an input/output request accumulator;

when any input/output requests are accumulated in the input/output request accumulator, sequentially read out each accumulated input/output request in accordance with a predetermined reference time; and execute input/output processing in response to each read input/output request, with respect to a storage medium, wherein during the readout processing, in order to attain a desired data rate of the stream data, the computer is caused to delay processing for reading out each metadata input/output request for a fixed period specified by the reference time and to collectively execute the delayed metadata input/output request readout processing.

24. A data recording and reproduction program stored in a computer-usable medium for executing recording of information onto a storage medium and reproduction of the information recorded on the storage medium, said program, when executed by a computer, causing said computer to:

classify each request from a recording/reproduction controller into any one of a request for input/output of real-time processing data, a request for input/output of metadata, and a request for input/output of non-real-time data not to be applied to real-time processing;

sequentially accumulating each classified input/output request in an input/output request accumulator;

when any input/output requests are accumulated in the input/output request accumulator, sequentially reading each accumulated input/output request in accordance with a predetermined reference time; and execute input/output processing in response to each read out input/output request, with respect to a storage medium, wherein during the readout processing, in order to attain a desired data rate of the stream data, the computer is caused to delay processing for reading out each non-real-time data input/output request for a fixed period specified by the reference time and to collectively execute the delay non-real-time data input/output request readout processing.

* * * * *